United States Patent
Sokolan et al.

(10) Patent No.: US 8,429,740 B2
(45) Date of Patent: Apr. 23, 2013

(54) SEARCH RESULT PRESENTATION

(75) Inventors: Patrick Sokolan, Redmond, WA (US);
Dennis Doherty, Redmond, WA (US);
Claude Duguay, Kenmore, WA (US);
William Radcliffe, Remond, WA (US);
Virgil Bourassa, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/766,936

(22) Filed: Apr. 26, 2010

(65) Prior Publication Data
US 2011/0265177 A1 Oct. 27, 2011

(51) Int. Cl.
*G06F 7/04* (2006.01)
*G06F 12/00* (2006.01)

(52) U.S. Cl.
USPC .......................................................... 726/19

(58) Field of Classification Search ................... 707/769, 707/E17.014, 706, 783, 784, 786, E17.04; 726/19, 27, 28–30
See application file for complete search history.

(56) References Cited

U.S. PATENT DOCUMENTS

| 6,889,205 | B1 | 5/2005 | Lamm |
| 7,130,841 | B1 | 10/2006 | Goel et al. |
| 7,328,204 | B2 | 2/2008 | Coady |
| 2002/0184317 | A1 | 12/2002 | Thankachan |
| 2004/0088286 | A1 | 5/2004 | Hackleman et al. |
| 2006/0259614 | A1 | 11/2006 | Patrick |
| 2008/0065995 | A1* | 3/2008 | Bell et al. ........................ 715/751 |
| 2008/0140452 | A1 | 6/2008 | Seul et al. |
| 2009/0019379 | A1 | 1/2009 | Pendergast et al. |
| 2009/0282005 | A1* | 11/2009 | Kim et al. ............................ 707/3 |
| 2010/0010912 | A1 | 1/2010 | Jones et al. |
| 2011/0066606 | A1* | 3/2011 | Fox et al. ........................ 707/706 |
| 2011/0225193 | A1* | 9/2011 | Jennings et al. .............. 707/776 |

OTHER PUBLICATIONS

"Redaction and Removing Metadata to Control Access to Sensitive Content", Retrieved at << http://www.updateadobe.com/edm/1866/AcrobatAnswers9_05_PDF.pdf >>, pp. 1.

* cited by examiner

*Primary Examiner* — Beemnet Dada
(74) *Attorney, Agent, or Firm* — Michael B Dodd; Dodd Law Group (57) ABSTRACT

A data presentation system for a search engine may use classified or tagged elements in a resulting document to create a search result document that has portions redacted, modified, or changed based on the tags or classifications of elements within the document. The document may be rebuilt from the search engine database at presentation time with one or more elements changed or modified. The permission settings for a user or other factors may be used to determine which elements within the document are permitted to be accessed.

20 Claims, 4 Drawing Sheets

SEARCH RESULT PRESENTATION

BACKGROUND

Search results from typical web search engines may contain a link to a web page or other document that a user may download or fetch. When the document may contain information that is sensitive, a typical search engine architecture relies on a source server to permit or deny access, and that access may be either full access when the user has full permission to view the document, or no access when the user does not.

SUMMARY

A data presentation system for a search engine may use classified or tagged elements in a resulting document to create a search result document that has portions redacted, modified, or changed based on the tags or classifications of elements within the document. The document may be rebuilt from the search engine database at presentation time with one or more elements changed or modified. The permission settings for a user or other factors may be used to determine which elements within the document are permitted to be accessed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A data presentation system for a search system may create and present a version of a selected document with some items removed, changed, or otherwise altered. The data presentation system may create a representation of a document with redactions or changes based on a user's credentials and a policy that permits or denies access to certain types of information.

The documents may be stored in a database and may be tagged to identify various types of information contained in the document. The tags may identify data that may be a personal name, financial records, medical information, or other information that may be sensitive or for which access may be limited. When a document is presented, the sensitive or restricted data may be removed so that the recipient may have access to the document with the restricted data redacted or obfuscated.

The data presentation system may re-create the document on request from the database that contains the tagged data. In some embodiments, the re-created document may contain the same text but different formatting or presentation than the original document, although some embodiments may include formatting or presentation styles. Some embodiments may also include a link to the data source, which may have an authentication and policy mechanism that may permit or deny access to the original document based on a user's credentials.

Throughout this specification and claims, the term "document" is used to denote the atomic unit that is stored and manipulated by the various systems. The "document" may be a word processing document, spreadsheet document, or other similar file. In some cases, the "document" may be a database record, web page, email message, or any other unit. The "document" may be text based or may include audio, video, or other types of data which may be classified, tagged, searched, or otherwise manipulated.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage device (SSD), or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
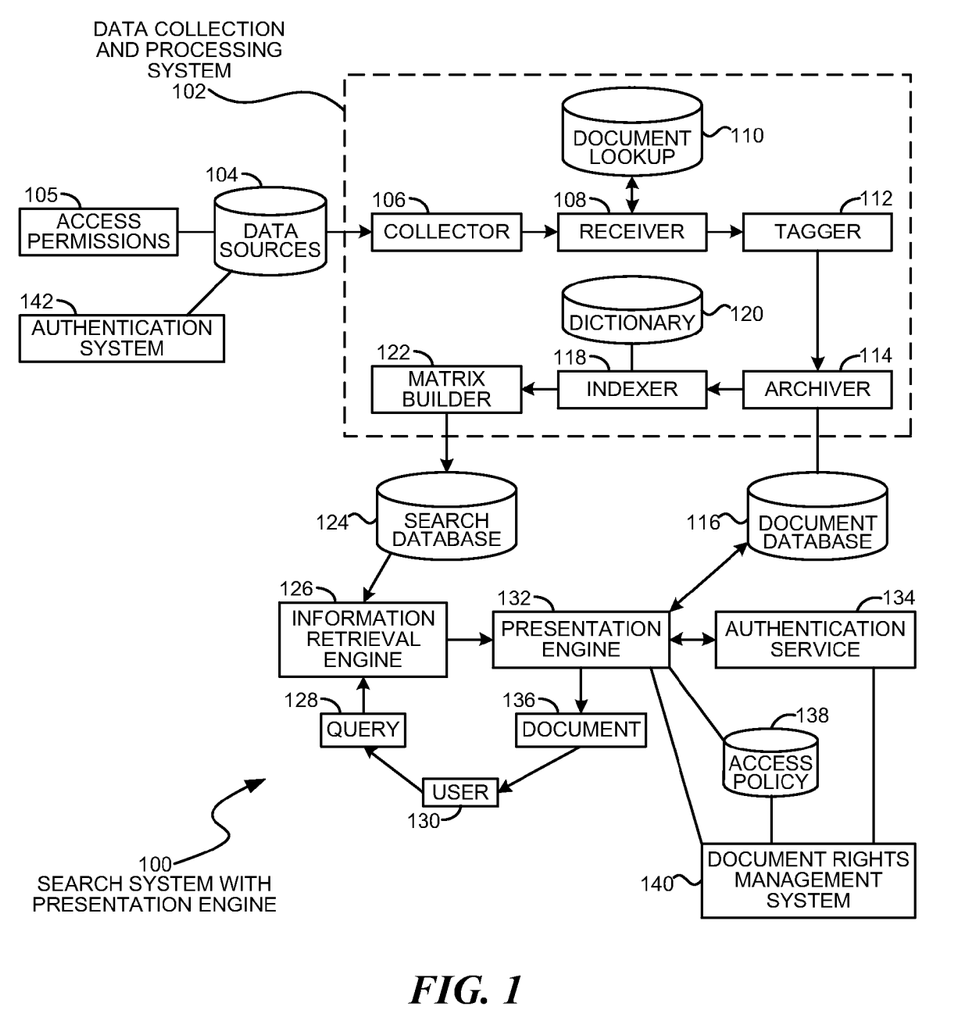
FIG. 1 is a diagram illustration of an embodiment showing a search system with a presentation engine.

FIG. 1 is a diagram of an embodiment 100, showing components for a search system with a presentation engine for preparing search results that may be redacted or changed based on a user's access permissions. Embodiment 100 is a simplified example of a search system that may be deployed on one or many hardware platforms.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a search system that may create a searchable database that may be used to create redacted or changed versions of documents based on a user's permission settings. Embodiment 100 is an example of a search system that may collect documents that may contain sensitive or classified data, and may make those documents searchable and accessible to users who may or may not have access permissions to the sensitive or classified data.

In one use scenario, a search system may be constructed to index documents that may contain sensitive information. For example, the documents may contain raw results from a set of clinical trials for a medical device. The documents may be made available to the researchers associated with the trials, as well as the designers of the medical device. The researchers may be given access to certain types of patient information, such as a patient's full name, while the designers may be given access to the results without the patient's name. When a search may be performed by the designers, a document may be created with the patient's names redacted.

In another use scenario, a search system may be constructed to index and store documents related to service problems with a computer system. The service problems may be collected by an original equipment manufacturer and may include a customer's name, for example. The original equipment manufacturer may wish to make the service problems available to a third party, such as a software manufacturer or a vendor, but the original equipment manufacturer may not wish to expose their customer's name to the vendor.

In the use scenario, the search system may be made available to the vendor, and the search system may replace the customer's name with a customer identifier, which may be a number for example. The customer identifier may be used by the vendor to correlate related service problems, but the vendor may not be able to determine the actual customer's name. The search system may maintain a lookup database so that a report from the vendor may be cross referenced by the original equipment manufacturer to provide feedback to the customer.

The search system may create a document database that may have a representation of an original document that may be used to rebuild a redacted or changed document in response to a search request. In some embodiments, the document database may contain all of the information that a presentation engine may use to create the redacted version of the document. In other embodiments, the document database may contain information that may be used along with the original document to create a redacted version.

The documents used in the search system may be tagged or annotated to identify portions of the document that may be changed during presentation. In some embodiments, the tagging or annotation may be embedded into the body text of a document and swapped with a redacted version of the tagged element during presentation.

The tagged elements in a document may be created by a document source or by subsequent analysis of the document. When a document may be obtained from a database, for example, various elements in a database record may have a label or tag, and such a tag may be preserved when the document may be received and processed by the search system.

In some embodiments, a tagger may analyze the content of a document to identify elements and apply tags to those elements. For example, a word processing document may be analyzed to identify proper names or other information that may be tagged and tracked.

The tagged elements may be used by the search system as elements for which a search may be performed. In such embodiments, the elements may be searched for the tag name, which may be "FirstName" and "LastName" or for values for that tag, such as "John Smith".

Embodiment 100 is an example of a search system that may be used for an enterprise search, where documents from many different sources may be collected, organized, and made searchable. Such a system may be applicable to a company or organization that may have multiple data sources, such as web servers, databases, file systems, and other data sources.

Embodiment 100 may be deployed on a single hardware platform or many hardware platforms that may operate in concert to deliver a search system. Embodiment 100 may be scalable to provide search capabilities on the entire World Wide Web.

In some embodiments, the search system of embodiment 100 may be deployed as a desktop search engine that may provide search capabilities for files and information stored on a single device.

The search system of embodiment 100 may process documents and build a set of sparse matrices that can be used to search for content or properties of the document. In some embodiments, several different matrices may be created for searching specific types of data, such as metadata, tags, date ranges, text, or various attributes. The various matrices may enable very fast searching for common search requests in certain embodiments.

The search system of embodiment 100 may use a hash calculation to create identifiers for documents and terms within the documents. The hash calculation may be used to eliminate dictionary database lookups when converting a value into an identifier. The hash value and the term name may be stored in a dictionary for reverse lookups. The hash calculation may be MD5 or other similar hash that may have minimal or no collisions.

The search system of embodiment 100 may have a data collection and processing system 102 that may collect data from various data sources 104 and create a document database 116 and a search database 124 that an information retrieval engine 126 and a presentation engine 132 may use to respond to search requests. The data collection and processing system 102 may operate in a background process or otherwise be decoupled from the operations of the information retrieval system.

In many embodiments, the data collection and processing system 102 may create updates to the search database 124 and document database 116 and may publish updates to the databases as changes are received and processed. In many such embodiments, the data collection and processing system 102 may operate on a different hardware platform or set of hardware platforms than the information retrieval engine 126.

The data collection and processing system 102 may begin with a set of collectors 106 that may gather documents from data sources 104 and feed those documents into a receiver 108.

The collectors 106 may connect to various data sources 104. In some cases, the collectors 106 may be web crawlers that may traverse a web service. The collectors 106 may monitor file systems or other repositories. In some embodiments, the collectors 106 may process data records from various databases. Each data record may be considered a 'document'. Examples of such data records may be web pages that are created on-the-fly, email messages provided from an email system, financial reports generated from a financial database system, or other data records.

The receiver 108 may receive the output from the collectors 106 and transmit the received documents to a tagger 112. In many cases, the receiver 108 may create a document identifier by assigning a sequential number to each new document. The document identifier may be stored in a document lookup database 110 along with a hash of a Uniform Resource Identifier (URI) that identifies where the document may be found.

When a document is received, the hash of the URI may be performed and determined if the document has already been processed by looking up the hash in the document lookup database 110. If the hash is found, the associated document identifier may be used. If the hash is not found, a new document identifier may be determined by using the next sequential number as the new document identifier. The hashed URI may be stored with the document and used as a metadata term for the document in some cases.

The tagger 112 may analyze the documents and perform any type of processing to prepare the documents for the indexing and search process. In some embodiments, the tagger 112 may be to scan a document for text using optical character recognition, for example.

In some embodiments, the tagger 112 may analyze the document contents in order to create tags or to highlight key terms or type of data. For example, dates in a document may be tagged and used in a date range matrix for searching for references to specific dates or date ranges.

An archiver 114 may create a copy of the document in a document database 116. In cases where a user does not have permission to view a full version of a document returned in a search result, a version of the document may be created using the data stored in the document database 116.

An indexer 118 may process the document to identify words, phrases, ngrams, or other searchable terms. The indexer 118 may use a dictionary 120 that may contain, among other things, words and phrases in a language, such as English. The indexer 118 may look up the words in the dictionary 120 to determine an index or identifier for the word.

In some embodiments, certain types of searchable terms may be created by performing a hash on the term to create a hash result, and the hash result may be used as the term identifier. Such embodiments may be useful when the number of terms becomes very large, as may be the case when terms include database indexes or other identifiers. In such embodiments, the indexer 118 may not perform lookups in the dictionary 120 to determine term identifiers.

Some embodiments may use a combination of hashed terms and language identifiers to determine term identifiers. In such an embodiment, a lookup may be performed in the dictionary 120 to determine if a word or term is already present. If the term is not present in the dictionary 120, a hash may be performed on the term and the hash value used as the term identifier.

Such an embodiment may not add new terms to the dictionary 120 so that the lookup operations do not become more processing intensive. Another instance of the same term may produce a hash value that is identical to the first instance, and the hash value calculation may consume fewer resources than a look up to a large dictionary. Such embodiments may maintain a second dictionary for reverse lookups of term identifiers to retrieve the original term.

A matrix builder 122 may create and update a search database 124. The search database 124 may contain a sparse matrix or a processed sparse matrix that may be used by an information retrieval engine 126 to search for searchable terms, ngrams, words, phrases, or other terms to return a set of documents that are relevant to the search terms.

The information retrieval engine 126 may search for documents using a set of search terms received in a query 128 from a user 130. The information retrieval engine 126 may search for those terms in the search database 124 and create a score or ranking for the search results, which may be considered raw search results.

The raw search results may be processed by a presentation engine 132 to create a set of results to display. From the set of results, the user may select one of the results. From the selection, a document 136 may be created that contains information for which the user may have permission to view and may have other information redacted, obfuscated, or otherwise unavailable. In some cases, the other information may be blanked, presented with a black box showing redaction, concatenated to show initials, or presented in some other manner.

The presentation engine 132 may use an authentication service 134 to authenticate a user's credentials, and may be use an access policy 138 to determine which types of information the user may access.

The user's credentials and the access policy 138 may determine how much data, if any, a user may be permitted to view and what types of access restrictions may be placed on a document received from the search system.

In some embodiments, the search system may maintain an authentication service 134. In such an embodiment, the access permissions 105 of the data source 104 may be incorporated into an access policy 138, and the authentication service 134 may authenticate a user's credentials.

In other embodiments, a data source 104 may have an authentication system 142 that may be queried when a user presents credentials along with a search query 128. In some embodiments, the authentication service 134 may have a federated relationship with a data source authentication system 142 where each authentication service may accept authentication tokens from the other authentication service.

The search system may maintain specific permission settings for each document as metadata associated with that document. The permission settings may be stored in the document database 116 and used to determine which data, if any, may be accessed based on a user's credentials.

Other embodiments may use an access policy 138 that may determine which data and data types may be accessed by specific users or groups of users. The access policy 138 may define specific types of data, for example personally identifiable information, that may have restrictions. In the example, the access policy 138 may include a definition of personally identifiable information such as first name, last name, and other terms.

The access policy 138 may define the types of access individual users may have. In some cases, the access policy 138 may define access permissions for groups of users, where certain users may be members of one or more groups.

In some embodiments, a digital rights management (DRM) system 140 may be associated with a document 136. The DRM system 140 may permit or deny certain operations with the document 136. For example, the document 136 may be configured with the DRM system 140 to deny any copying or distribution of the document 136. In another example, the DRM system 140 may permit access to the document 136 for other users based on the access policy 138. The DRM system 140 may use the authentication service 134 to determine valid user credentials.

Figure 2:
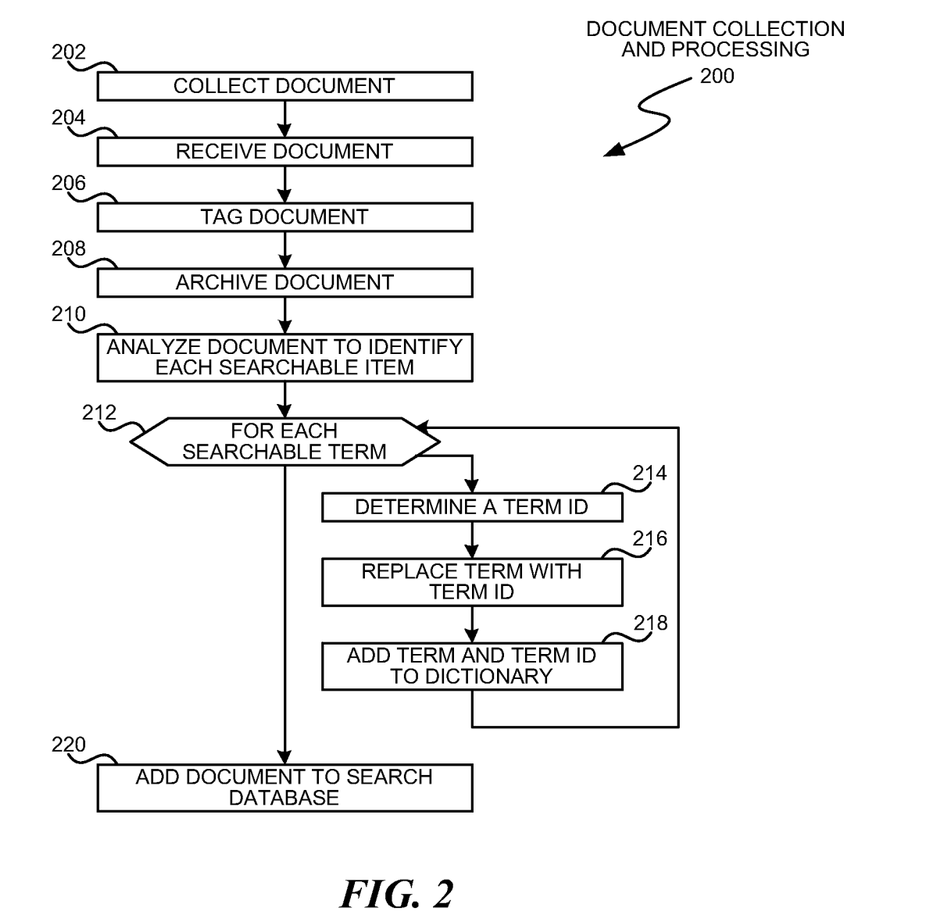
FIG. 2 is a flowchart illustration of an embodiment showing a method for document collection and processing.

FIG. 2 is a flowchart illustration of an embodiment 200 showing a method for preparing a document for searching. Embodiment 200 is a simplified example of the processes that may be performed by some of the components as described in embodiment 100. Specifically, embodiment 200 may represent one method that may be performed by the collectors 106, receiver 108, tagger 112, archiver 114, indexer 118, and matrix builder 122 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 3:
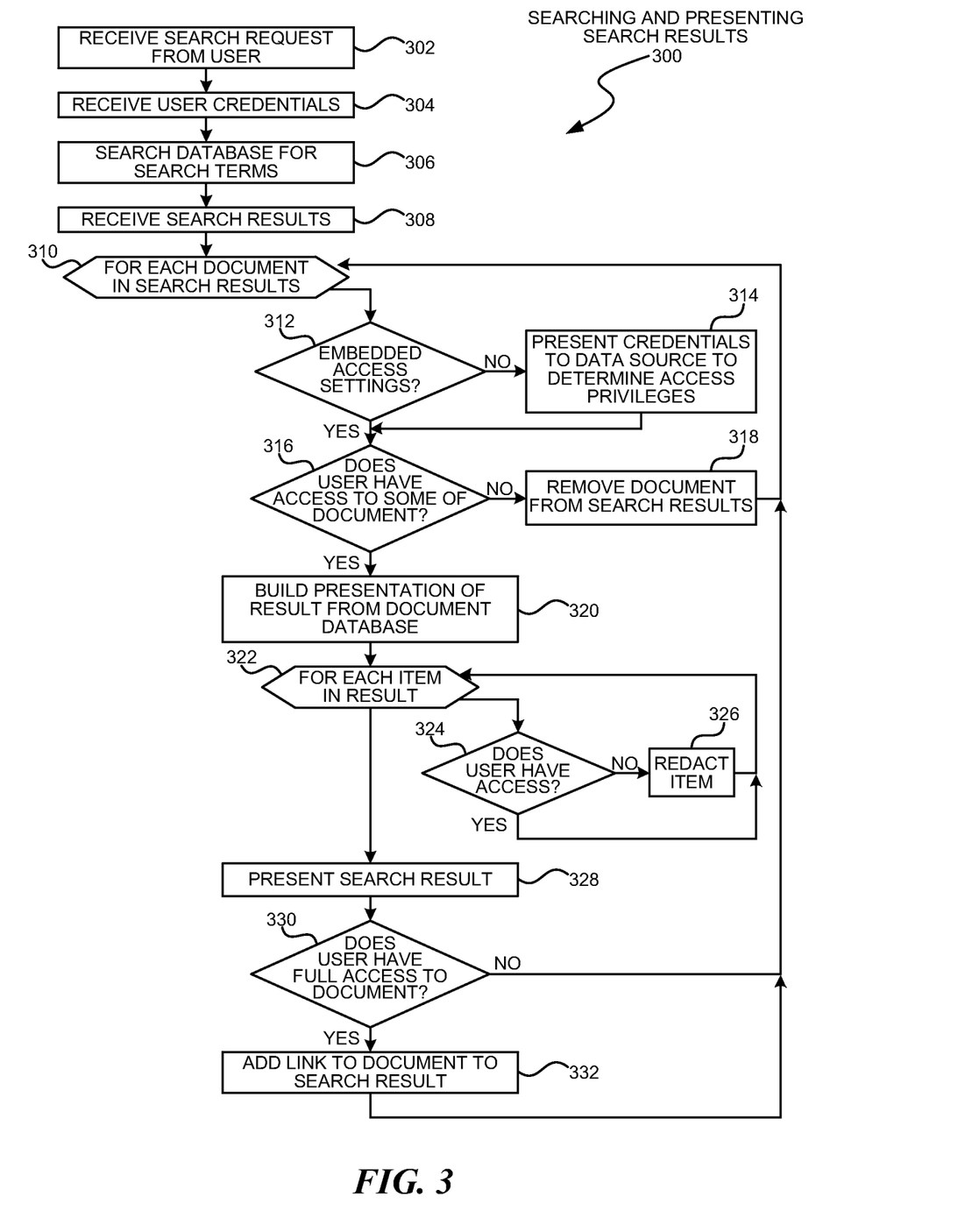
FIG. 3 is a flowchart illustration of an embodiment showing a method for searching and presenting search results.
Figure 4:
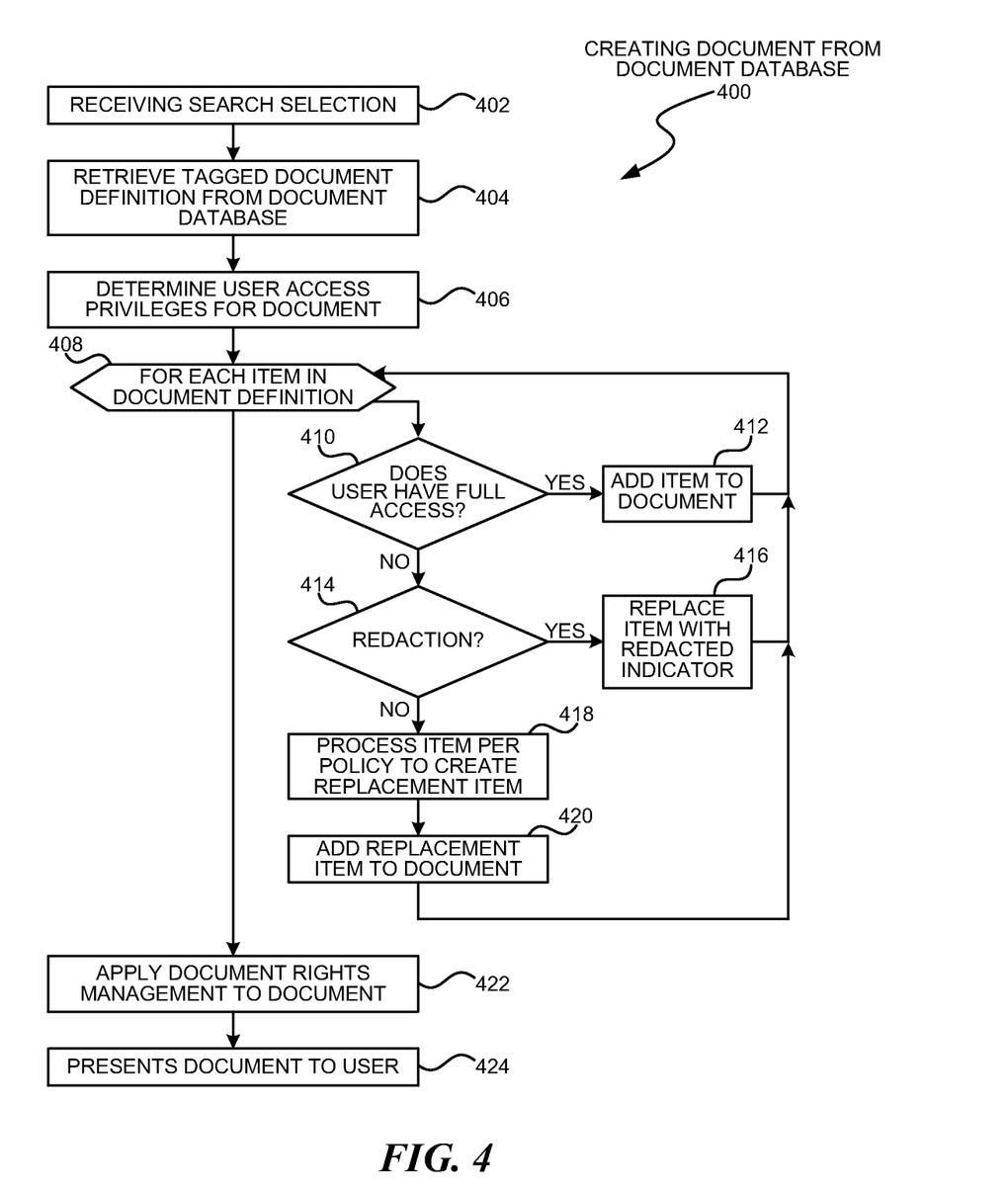
FIG. 4 is a flowchart illustration of an embodiment showing a method for creating a document from a document database.

Embodiment 200 illustrates a highly simplified example of a process for preparing a document for searching and adding the document to a search database. Embodiment 200 receives a document, processes the document, and adds the document to a search database. The document may be tagged or annotated so that a presentation engine may permit or deny access to certain fields or elements within the document. Embodiment 300 presented later in this specification may illustrate a method for searching and presenting search results, and embodiment 400 may illustrate a method for creating a document from a document database.

Embodiment 200 prepares a document by tagging the document and archiving the document in a document database. The tags may be used to identify certain elements of the document that may be modified, substituted, or removed when a document is presented to a user.

The document presented to the user may be created from the document database with or without accessing the original document at the time of presentation. When the document is created without accessing the original document, all of the content of the original document may be present in the document database. In other embodiments, the descriptions or tags in the document database may be used to modify the original document that may be accessed as part of the presentation process.

A document may be collected in block 202 and received in block 204. In many cases, a document may be collected by a process or operation that is performed at a physical location away from portions of the search system. For example, a set of web crawlers may traverse a website from one server or datacenter and send documents to the search system. In another example, a monitoring process may operate on the same server or system as a database and may identify and transmit document changes to the search system.

When a document is received in block 204, a document identifier may be assigned to the document and used throughout the process. In some embodiments, a Uniform Resource Identifier may be available for each document and may be used as a signature to identify specific documents. The signature and document identifier may be stored in a database for document lookup and used to identify a received document that may be updated or changed.

In some embodiments, the received document may be identified as a changed or modified document when the document is received. Some embodiments may process changed or modified documents in a separate manner. For example, a modified document may be processed at a lower or higher priority to newly added documents. In some embodiments, a modified document may be processed by identifying the changes and only processed the incremental changes to the document. In other embodiments, a changed document may be re-processed using the same processes as a newly added document.

The document may be tagged in block 206. The tagging step may identify items in a document that may be used as terms, attributes, tags, or other parameters for which the document may be searched. In some embodiments, a document may be received in a tagged form, with various tags identifying the parameters that may be converted to and searchable by terms.

The tagging of block 206 may analyze the content and metadata of the document to identify portions of the data that may be sensitive or may be redacted, modified, or replaced when the document is presented to users who may not have access to the entire document contents. In some embodiments, the tagging of block 206 may have specialized classification systems that may automatically search the document to identify items that may be sensitive or classified.

In some embodiments, documents may be received from a data source with many tags already in place. The tagging of block 206 may use the tags from the data source to further analyze the content of the document to identify further instances of a pre-tagged item, or may use the tags from the data source to determine what other items may be tagged.

In block 208, the tagged document may be archived into a document database. The archived document may be used by a presentation engine to create a redacted document in response to a search request.

The document may be analyzed in block 210 to identify searchable terms. The searchable terms may or may not include some of the items tagged in block 206. The searchable terms may include words, phrases, or other terms for which the search engine may be capable of searching. Each searchable term may be processed in block 212.

For each searchable term in block 212, a term identifier may be determined in block 214. The term may be replaced with the term identifier in block 214 and the term and term identifier may be added to a dictionary in block 218.

A term identifier may be determined by calculating a hash value for the term. In one embodiment, the hash function may be MD5 or other hash function. Many embodiments may use a hash function that has limited or no collisions.

In some embodiments, a term identifier may be determined by looking up the term in a dictionary and returning an index or other value that may be used as a term identifier.

After determining all the term identifiers in block 212, the document may be added to a search database in block 220. In many systems, a sparse matrix may be created from the analysis of many individual documents. The sparse matrix may have term identifier on one axis and document identifiers on another axis, with frequency counts or other information at each element in the matrix. Many such embodiments may collapse or consolidate the sparse matrix to speed up searching.

FIG. 3 is a flowchart illustration of an embodiment 300 showing a method for searching and presenting search results. Embodiment 300 is one example of a method by which a set of search results may be presented to a user based on the user's credentials and an access policy.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates one method by which a set of search results may be presented to a user, and where the search results may be fully or partially redacted based on the access permissions of the user. In cases where a user may have full access to a document, the user may be given a link to the original document.

In block 302, a search request may be received from a user. In block 304, the user's credentials may also be received. The search request may include terms or descriptions of a desired document or group of documents.

The database may be searched in block 306 using the search terms and the results may be received in block 308. The results may include a list of documents in ranked order, based on a score or other determination by an information retrieval engine. Each document found in the results may be processed in block 310.

For each document in block 310, if the document has embedded access settings in block 312, the user credentials may be presented to a data source authentication service in block 314 to determine the user's access privileges.

If the user does not have access privileges to any of the document in block 316, the document may be removed from the search results in block 318. In such a case, the result may not be presented to the user. If a second user who had access to the document were to perform the same search, the second user may be able to view at least part of the search results.

When the user has access privileges to at least a portion of the document in block 316, a presentation of the result may be built from the document database in block 320. The presentation may include, for example, a snippet of text surrounding a search term, the document tile, as well as other metadata or content from the document that may be stored in the document database. Each item in the result may be analyzed in block 322.

For each item in the result in block 322, if the user does not have access to the item, the item may be redacted in block 326. If the user has access to the item in block 324, the item may be left in the results presentation and the process may return to block 322 to process all of the items.

The process of blocks 322 through 326 may remove items from the search results that the user may not have permission to view. For example, a snippet of text from the document may contain a tagged item such as personally identifiable information. That item may be removed from the presentation of the search results but the remainder of the search results may be presented.

The redaction in block 326 may be performed in several manners. In one embodiment, the item may be replaced with a black block that may represent removed or redacted content. In such an embodiment, the user may know that the content has been hidden or removed. In another embodiment, the content may be removed without an indicator that the content was present. In such an embodiment, the user may not recognize that the content is missing.

The search result may be presented to the user in block 328. If the user has full access to the original document in block 330, a link to the original document may be added to the search result in block 332 and presented to the user. If the user does not have full access to the original document in block 330, the link may not be displayed. In such a case, the user's only access to the document may be through a redacted version that may be created by the search system. An example of such an operation may be found in embodiment 400.

FIG. 4 is a flowchart illustration of an embodiment 400 showing a method for creating a document from a document database. Embodiment 400 is one example of a method by which a redacted document may be created and presented as a result of being selected from a set of search results, such as the search results of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 represents one method by which a redacted or edited version of a document may be created in response to a selection from a search result. The redacted document may have portions of the document removed based on a user's credentials and an access policy.

The search selection may be received in block 402, and the associated tagged document may be received from a document database in block 404.

The user access privileges for the document and its contents may be determined in block 406. In some embodiments, the access privileges may be determined by an authentication service and an access policy that may be maintained by the search system. In other embodiments, the access privileges may be determined by an authentication service and access policy that may be maintained by the document source.

For each item in the document definition in block 408, if the user has full access to the item in block 410, the item may be added to the document in block 412.

If the user does not have full access in block 410, the item may be processed in two different manners. If the item is to be redacted in block 414, the item may be replaced with a redacted indicator in block 416. If the item is not to be redacted, the item may be obfuscated or otherwise replaced. In block 418, the replacement item may be determined and used to replace the item in block 420.

The replacement item in block 418 may be determined in several different manners. In some cases, an identifier for the item may be created and stored in a dictionary. When the item is encountered in block 418, the identifier may be determined by looking up the item in the dictionary. Such a method may be useful when a consistent identifier is useful to the document recipient but the real value may be sensitive.

In one example of such a use scenario, a search system may maintain documents that refer to a specific person, where the person's name may be sensitive information. The process of block 418 may replace the person's name with a unique number that may be assigned to that person. The document recipient may be able to correlate information from multiple documents that refer to the person but may not know the actual person's name.

In another example, the item may be a full name of a person. The process of block 418 may concatenate the person's full name to a first and last initial letter. In still another example, the item may be replaced by a random number or random text to obfuscate the actual value.

After each item in the document is processed in block 408, some embodiments may apply a digital rights management control to the document. Some DRM technologies may permit access to the document for users that present credentials and may apply an access policy using those credentials. The DRM system may restrict copying, distribution, and use of the document in some cases.

Once the document is prepared, the document may be presented to the user in block 424.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A search result presentation system, the search result presentation system comprising:
   one or more processors;
   system memory;
   a database comprising tagged data, said tagged data tagged from one or more documents, for each of said one or more documents, said tagged data identifying items in said document for which said document may be searched and also identifying portions of said document that are eligible for alteration, based on classification of said identified portions, when presented to a user that does not have access to the entire document contents;
   an information retrieval system that:
      receives a search request from a user, said search request comprising search terms; and
      searches for said search terms in said database to identify a plurality of search results, said search results comprising references to the one or more documents; and
   a presentation engine for presenting the plurality of search results that:
      identifies a search result from within said plurality of search results, said search result for a document from among the one or more documents, said search result referencing a first tagged portion and a second tagged portion of said document;
      determines that said user has access privileges to at least a portion of said document based on an access policy;
      determines that said user does not have access to said first tagged portion of said document based on classification of the first tagged portion and based on the access policy;
      alters said search result so that said tagged first portion is not presented as part of said search result; and
      transmits said altered search result, including said second tagged portion of the document for presentation to said user.

2. The system of claim 1, said user having credentials, said presentation engine that further:
   presents said credentials to an authentication service; and
   authenticates said user for document access based on a response from said authentication service.

3. The system of claim 1, wherein altering said search result so that said first tagged portion is not presented comprises redacting said first tagged portion from the search result.

4. The system of claim 3, wherein redacting said first tagged portion comprising replacing the first tagged portion with a black block.

5. The system of claim 3, wherein redacting said first tagged portion comprising modifying the search result so there is no indication the first tagged portion was included in the search result.

6. The system of claim 1, further comprising a data collection system that:
   collects documents;
   prepares the collected documents for searching by tagging the collected documents to create the tagged data; and
   stores the tagged data in the database.

7. The system of claim 1, said presentation engine that further:
   identifies the search result from within a second plurality of search results for a second user;
   determines that said second user has access privileges to at least a portion of said document based on the access policy;
   determines that said second user does not have access to said second tagged portion of said document based on classification of the second tagged portion and based on the access policy;
   differently alters said search result so that said second tagged portion is not presented as part of said search result; and
   transmits said differently altered search result, including said first tagged portion of the document for presentation to said second user.

8. The system of claim 1, wherein tagged data identifying portions of a document for alteration comprises tagged data identifying portions of a document for alteration based on classifying the identified portions as sensitive data.

9. The system of claim 1 further comprising:
   a federated authentication relationship with a data source system, said data source system being a data provider for said data collection system.

10. At a computer system, the computer system including one or more processors and system memory, a computer-implemented method for presenting a document selected from within search results, the method comprising:
    receiving a search request from a user, said search request comprising search terms;
    searching a search database with said search terms to identify a document that satisfies the search terms, said search database including tagged data, said tagged data from one or more documents, for each of said one or more documents, said tagged data identifying items in said document for which said document may be searched and identifying portions of said document as eligible for alteration, based on classification of said identified portions, when presented to a user that does not have access to the entire document contents;
access raw search results identifying the document;
determining access permissions for said user from an access policy, said access policy defining one or more portions of the document for which said user does not have permission to access;
the processor creating altered search results by redacting any of said one or more portions of said document for which said user does not have permission to access from said raw search results;
presenting said altered search results in response to said search request;
receiving an indication that said document was selected from within said altered search results; and
the processor building an altered representation of said document from a document database, said altered representation modifying the one or more portions of said document by replacing the one or more portions of said document with other data, said document database storing a copy of the document for use in rebuilding representations of the document for users that do not have permission to view a full version of the document.

11. The method of claim 10, wherein said document database further stores information that can be used along with the copy of the document to create a redacted version of the document.

12. The method of claim 10, wherein building an altered representation of said document comprises redacting each of the one or more said potions of the document from said document.

13. The method of claim 11, wherein redacting each of the one or more said potions of the document from said document comprises replacing each of the one or more said portions of the document with a redacted indicator.

14. The method of claim 10, wherein building an altered representation of said document comprises replacing each of the one or more said portions with a corresponding replacement item.

15. The method of claim 10, wherein determining access permissions for said user comprises referring to an authentication mechanism to determine access permissions for said user.

16. The method of claim 15, wherein referring to an authentication mechanism comprising referring to an authentication mechanism associated with a data collection system used to collect documents for inclusion in the document database.

17. A document presentation system, the document presentation system comprising:
one or more processors;
system memory;
a document database;
a search database;
a document collection system that:
    collects documents from one or more data sources;
    tags documents, including for each collected document:
        tags items in said document for which said document can be searched; and
        tags portions of said document as eligible for alteration, based on classification of said portions, when presented to a user that does not have access to the entire document contents;
    stores the tagged documents in a search database for use in generating search results that match received search requests; and
    stores copies of collected documents in the document database for use in rebuilding representations of a collected document for a user that does not have permission to view a full version of the collected document
a presentation engine for presenting documents that:
    receives raw search results corresponding to search terms entered of search terms by a user, the raw search results including references to one or more collected documents;
    for each of the one or more referenced documents:
        determining access permissions for said user from an access policy, said access policy defining one or more portions of the document for which said user does not have permission to access;
        creating altered search results by redacting any of said one or more portions of said document for which said user does not have permission to access from said raw search results; and
        presenting said altered search results in response to said search request;
    receiving a selection of said altered search result for a document from among said one or more referenced documents; and
    building an altered representation of said document from said copy of said document stored in said document database, said altered representation modifying said one or more portions of said document for which said user does not have permission to access by replacing said one or more portions of said document with other data.

18. The system of claim 17, wherein building an altered representation of said document comprises redacting said one or more portions of said document for which said user does not have permission to access.

19. The system of claim 17, said presentation engine that further:
receives credentials from said user;
presents said credentials to a data source; and
receives said access policy from said data source.

20. The system of claim 19 further comprising:
an authentication system being a federated authentication system with said data source.

* * * * *